United States Patent
Baudel et al.

(10) Patent No.: US 8,972,327 B2
(45) Date of Patent: Mar. 3, 2015

(54) TRANSFORMATION OF A SOURCE MODEL TO A TARGET MODEL

(71) Applicant: International Business Machines Corporation, Armonk, NY (US)

(72) Inventors: Thomas Baudel, Gentilly Cedex (FR); Hugues Citeau, Gentilly Cedex (FR); Marcos Didonet Del Fabro, Curitiba (BR)

(73) Assignee: International Business Machines Corporation, Armonk, NY (US)

(*) Notice: Subject to any disclaimer, the term of this patent is extended or adjusted under 35 U.S.C. 154(b) by 268 days.

(21) Appl. No.: 13/688,462

(22) Filed: Nov. 29, 2012

(65) Prior Publication Data
US 2013/0144829 A1 Jun. 6, 2013

(30) Foreign Application Priority Data
Dec. 1, 2011 (EP) .................................... 11306599

(51) Int. Cl.
*G06N 5/02* (2006.01)
*G06F 9/45* (2006.01)
(52) U.S. Cl.
CPC ...................................... *G06N 5/02* (2013.01)
USPC ............................................ 706/47; 717/136

(58) Field of Classification Search
None
See application file for complete search history.

(56) References Cited

U.S. PATENT DOCUMENTS

| 7,779,396 B2 | 8/2010 | Meijer et al. | |
| 2009/0064091 A1 | 3/2009 | Tonkin et al. | |
| 2009/0125878 A1* | 5/2009 | Cullum et al. | 717/106 |
| 2009/0150854 A1* | 6/2009 | Elaasar et al. | 717/104 |
| 2009/0313613 A1* | 12/2009 | Ben-Artzi et al. | 717/137 |
| 2010/0146492 A1* | 6/2010 | Shacham et al. | 717/137 |
| 2012/0192143 A1* | 7/2012 | Elaasar | 717/104 |

* cited by examiner

*Primary Examiner* — Alan Chen
(74) *Attorney, Agent, or Firm* — Cantor Colburn LLP

(57) ABSTRACT

An aspect of the invention includes transforming a source model to a target model. A source model is received and a transformation specification that includes a set of rules is accessed. Each rule includes a pattern description and a production component. The pattern description includes a pattern in the source model and the production component includes an algorithm for generating an output in the target model from the pattern. For each expression in the source model, the expression is decomposed into sub-expressions, matching rules in the transformation specification for the expression and the sub-expressions are detected, one of the matching rules having the most specific pattern description is selected, and the production component of the selected rule is executed to generate the output in the target model. The target model is created from the generated output.

15 Claims, 4 Drawing Sheets

US 8,972,327 B2

TRANSFORMATION OF A SOURCE MODEL TO A TARGET MODEL

PRIORITY

The present application claims priority to European Patent Application No. 11306599.9, filed Dec. 1, 2011, and all the benefits accruing therefrom under 35 U.S.C. §119, the contents of which in its entirety are herein incorporated by reference.

BACKGROUND

The present invention relates to computer modeling and more particularly, to transforming a source model to a target model.

In the field of computer technology, there is often a need to transform a model such as a computer program or data model written in a first language to a model written in a second language, while preserving the semantics of the original model. For many applications it is desirable to provide simple methods for translating applications written for a first modelling language into a second modelling language. By "simple methods," it is meant that, as far as possible, the technical person performing the translation should declare the translation properties as a set of rules or invariants to use rather than explicitly building a program that performs the translation.

Such declarative tools to perform model rewriting are widely explored in the area of Model Driven Engineering (MDE). Two known MDE frameworks are EMF (Eclipse Modeling Framework) from the Eclipse foundation, and MOF (MetaObject Facility), which is an OMG (Object Management Group) standard. The four most used model transformation systems are ATL (Atlas Transformation Language), a transformation language from the AtlanMod group, QVT (Query, Views, and Transformations), a standard proposed by OMG, Viatra 2, implemented by the University of Budapest and Epsilon Transformation Language, developed by the University of York.

These transformation languages and toolkits provide specialized constructs, which are useful for common software engineering practices. The languages are typically composed by a set of transformation rules. Rules are divided into two parts, firstly a left hand side (LHS) applies some pattern matching technique to select which rule is going to be executed and secondly, once a rule has been selected (i.e., matched), the right hand side (RHS), which can be considered as production component, is executed.

The pattern matching mechanisms used are, in general, relatively simple. ATL, QVT and Epsilon use similar techniques; the LHS contains the elements that are going to be matched. Consequently, the engines do a cross product of all the elements in the input condition. Viatra 2 is similar, but it provides in addition an incremental pattern matching mechanism. These kinds of pattern matching are adapted for matching a single element at a time, plus an overall pattern.

SUMMARY

According to one embodiment, there is provided a method of transforming a source model to a target model. The method includes receiving the source model and accessing a transformation specification that includes a set of rules. Each rule of the set of rules includes a pattern description and a production component. The pattern description includes a pattern in the source model, and the production component includes an algorithm for generating an output in the target model from the pattern. For each expression in the source model, the method includes decomposing the expression into sub-expressions, detecting matching rules in the transformation specification for the expression and the sub-expressions, selecting one of the matching rules having the most specific pattern description, and executing the production component of the selected rule to generate the output in the target model, thereby creating the target model from the generated output.

According to another embodiment, there is provided a system for transforming a source model to a target model. The system includes a computer processor. The computer processor is configured to implement a method. The method includes receiving the source model and accessing a transformation specification that includes a set of rules. Each rule of the set of rules includes a pattern description and a production component. The pattern description includes a pattern in the source model, and the production component includes an algorithm for generating an output in the target model from the pattern. For each expression in the source model, the method includes decomposing the expression into sub-expressions, detecting matching rules in the transformation specification for the expression and the sub-expressions, selecting one of the matching rules having the most specific pattern description, and executing the production component of the selected rule to generate the output in the target model, thereby creating the target model from the generated output.

According to a further embodiment, there is provided a computer program product for transforming a source model to a target model. The computer program product includes a computer readable storage medium having computer readable program code embodied therewith. The computer readable program code is configured to perform a method. The method includes receiving the source model and accessing a transformation specification that includes a set of rules. Each rule of the set of rules includes a pattern description and a production component. The pattern description includes a pattern in the source model, and the production component includes an algorithm for generating an output in the target model from the pattern. For each expression in the source model, the method includes decomposing the expression into sub-expressions, detecting matching rules in the transformation specification for the expression and the sub-expressions, selecting one of the matching rules having the most specific pattern description, and executing the production component of the selected rule to generate the output in the target model, thereby creating the target model from the generated output.

BRIEF DESCRIPTION OF THE SEVERAL VIEWS OF THE DRAWINGS

Embodiments of the present invention will now be described, by way of example only, with reference to the accompanying drawings, in which.

DETAILED DESCRIPTION

Exemplary embodiments provide a methodology that supports creation and management of declarative model transformations using nested pattern matching and subsumption. The pattern matching of the embodiments described herein enables the use of more local context in the pattern descriptions than existing methods, and the rules used in the embodiments provide looser semantics than those offered by existing methods, which allows the expressions of transformations to be terser but still precise, thereby rendering them easier to understand and to maintain.

Figure 1:
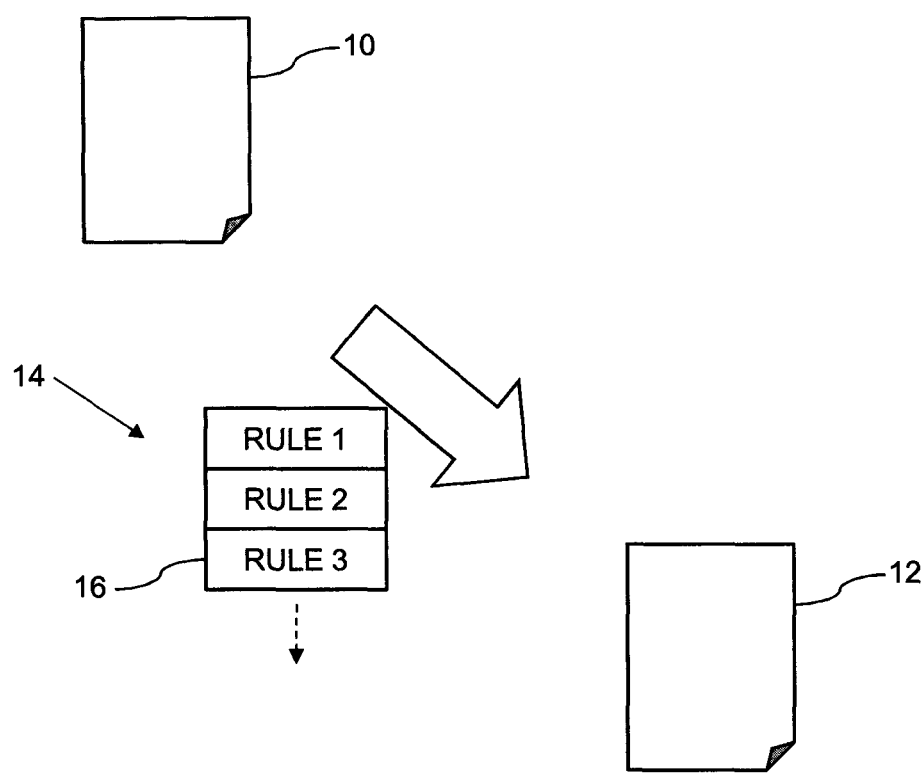
FIG. 1 is a schematic diagram of a transformation of a source model to a target model in accordance with an embodiment.

FIG. 1 shows schematically a diagram of a transformation or conversion of a source model 10 into a target model 12. The models 10 and 12 may be data models or computer programs that are written in different languages, and for purposes of illustration, it is desired to translate the source model 10 that is written in a first language into the target model 12 that is written in a second language. The transformation process is designed to preserve the semantic meaning that is represented within the source model 10 in the output of the process, which is the target model 12. This process is capable of being performed automatically without any input from a human operator.

In an embodiment, the transformation process is carried out using a transformation specification 14, which includes a set of individual rules 16. The transformation specification 14 is authored for the particular languages that make up the source and target languages used in the respective models 10 and 12. For example, the transformation process may be designed to convert the first (source) model 10, written in PASCAL, into the second (target) model 12, written in C. To achieve this transformation, the transformation specification 14 will provide a PASCAL to C specification 14. A goal of the transformation process is to produce a new model 12 that maintains the semantic meaning of the original model 10, but is written according to the specification of the C language.

The rules 16 of the transformation specification 14 describe how expressions within the source model 10 are to be identified and how they are to be converted into expressions in the language of the target model 12. The transformation specification 14 effectively provides an automated set of rules 16 that preserve the semantic meaning within expressions contained within the source model 10 as they are converted into expressions that contain the same meaning when they are rendered into the language of the target model 12. In an embodiment, a role of the transformation specification 14 is to provide the rules 16 necessary for an accurate transformation of the source model 10 into the target model 12.

Figure 2:
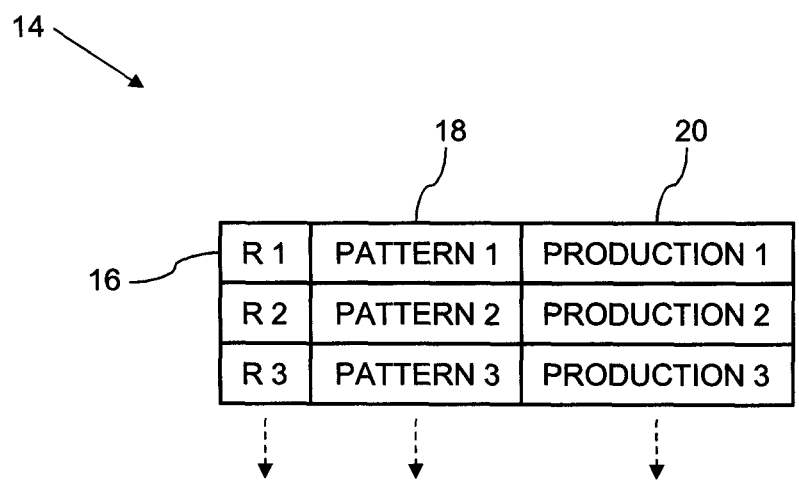
FIG. 2 is a schematic diagram of a transformation specification in accordance with an embodiment.

The transformation specification 14 is shown in more detail in FIG. 2. The transformation specification 14 includes a set of rules 16, and each rule 16 includes a pattern description 18 and a production component 20. In turn, each pattern description 18 includes a pattern in the source model 10, and each production component 20 includes an algorithm for generating an output in the target model 12 from the pattern in the respective pattern description 18. As discussed above with reference to FIG. 1, one purpose of the rules 16 is to preserve the semantic content of the expressions with the source model 10 when they are converted into expressions in the target model 12.

The pattern descriptions 18 need not be excessively complicated; rather, they may be simple instructions within the set of permitted instructions of the language of the source model 10 and, likewise, the corresponding production component 20 may be a simple substitution algorithm for rendering an instruction in the language of the first model 10 into an instruction in the language of the second model 12. However, it will be appreciated that the pattern descriptions 18 can be designed to detect complicated patterns within the source model 10 using, e.g., Boolean logic, wildcards, and the like.

Likewise, the corresponding production components 20 may be complicated algorithms with many clauses and instructions, in order to generate the correct output. However, in general, the decomposition of all of the constructs of the source language in individual cases may be each handled by a few rules that tend to produce transformations that are simple to read and manage, which is an advantage of the exemplary embodiments, as will be described further herein.

In an embodiment, the transformation specification 14 includes a large number of different rules 16, and the rules 16 within the transformation specification 14 may overlap, in the sense that a specific expression within the source model 10 can be matched to the pattern descriptions 18 of multiple rules 16 of the transformation specification 14. In this situation, a methodology is provided for resolving multiple matching of overlapping rules 16. This is described further herein. Essentially, a hierarchy of rules 16 may be utilized to automatically select the best rule 16 for use against the specific expression.

An example is presented to illustrate the process in greater detail. In this example, it is assumed a desire to migrate a set of rules written in JBoss Drools Rule Language (DRL) into JRules technical rules (IBM ILOG Rules Language—IRL). Among others, there exists a set of rules (that make up the transformation specification) that transforms the rule conditions from DRL into the rule conditions of IRL. In DRL, all the rule conditions are instances of a "PatternElement" element, so the type of the condition is determined based on the composition relations with the containing elements. DRL has different kinds of conditions, for example CollectConditional or NotConditional and others. To perform the transformation of these conditions, three rules are used.

Currently in ATL (Atlas Transformation Language), there are the following rules:

```
rule PatternElement2NotCondition {
    from inpattern : DRL!PatternElement (
    inpattern.refImmediateComposite( ).-
    oclIsTypeOf(DRL!NotConditional) )
        to outirl : IRL!NotCondition ( <set the attribute values> )
}
rule PatternElement2ClassCondition {
    from inpattern : DRL!PatternElement (
    inpattern.refImmediateComposite( ).-
oclIsTypeOf(DRL!CollectConditional ) )
        to outirl : IRL!ClassCondition (      <set the attribute
        values> )
}
rule PatternElement2SimpleCondition {
    from inpattern : DRL!PatternElement (
                    not
inpattern.refImmediateComposite( ).oclIsTypeOf(DRL!NotConditional)
and
                    not
inpattern.refImmediateComposite( ).-
oclIsTypeOf(DRL!CollectConditional))
        to outirl : IRL!SimpleCondition ( <set the attribute
        values> )
}
```

In this system, it must be guaranteed that all rules are kept disjunctive, i.e., the rules cannot be matched simultaneously. This means that the last rule above must explicitly negate the pattern description of the first two rules. This is required in all state of the art transformation specifications, because these specifications rely on a global execution context. The embodiments described herein allow the writing of the same rules in a more concise manner, without the need for a disjunctive condition on the third rule, but rather using nested matching and a default rule:

```
rule PatternElement2SimpleCondition {
    from parent : DRL!NotConditional;
        inpattern : DRL!PatternElement from parent.condition;
        to outirl : IRL!NotCondition ( <set the attribute values>)
}
rule PatternElement2FromCondition {
    from parent : DRL!CollectConditional;
        inpattern : DRL!PatternElement from parent.condition;
        to outirl : IRL!ClassCondition (<set the attribute values>)
}
rule PatternElement2SimpleCondition {
    from parent : DRL!Object; // default rule does not negate
conditions found in other related rules.
        inpattern : DRL!PatternElement;
        to outirl : IRL!SimpleCondition (<set the attribute values>)
}
```

The simpler rules (in the second case above) are easier understood by a user of the rules, since the navigation is performed from the top down and there is no need to fully specify the pattern in the final default rule, as is the case in prior art systems. In a typical usage scenario with hundreds of rules, this may lead to improvements in the usability of the process. In addition, this methodology provides two further enhancements to enable using this type of semantics in expressing the pattern matching.

Over existing systems, this technique firstly allows easier design, since the default rule can be written first and iterative design methods can add rules to enhance the transformation, yielding a more natural top-down design approach, and secondly this technique supports better maintenance, since for example, if the source language was to evolve by adding a condition type, the default rule would need to be edited to keep the strict disjunctive nature of the rules and over large and complex rule sets, finding the exact term to change may be difficult. Thirdly, there is easier reuse since rules are better encapsulated (they are more independent from each other), allowing an easier grasp of the overall structure to a newcomer wishing to reuse and modify the code.

Implementation of this methodology for the transformation language relies on two steps. The first step is the use of production-rules like semantics as a pattern-matching technique. The embodiments may be implemented by means of function rules, an internal interpretation of the IBM ILOG JRules technical rule language that provides this precise technique inside the Java language. An advantage of the production-rules like semantics is their implementation of subsumption and the use of rule priorities, which states that given a set of matching rules, the most specific is chosen for execution or the first declared one is chosen if there is more than one rule still matching. This detracts from a pure declarative form of transformation description, but suits many common uses.

The second step is the use of a transform collection. The implementation of the rules is encapsulated in a transformation interface, as shown below. The code is presented using Java, but it can be replaced by any other programming language, such as C# or C++.

```
interface Transformation {
    public Object transform(Object[ ] source);
    public List transformCollection (List source);
}
```

The interface has two methods, of which extensions and variations for this interface are explained herein. The transform method contains the transformation code. It takes one source object as an input, and it produces another object as an output. The type of the source parameter is generic, so this method can be reused throughout the code. This solution has two advantages over existing methods based on the Visitor pattern. First, it does not need to define "accept" or equivalent methods in every input class. Second, it integrates with powerful pattern matching.

The transformCollection method is a generic method that enables looping over an array and that calls transform for each element of the array. It enables transforming attributes that maps to arrays or lists. A generic implementation is the following. The List objects may be replaced by other kinds of objects that support sets and equivalents.

```
public List transformCollection( List list) ) {
    rule TransformCollection {
        when { sourceElements : List( ); }
        then {
            List target = new ArrayList( ) ;
            for (Iterator it = list.iterator( ) ; it.hasNext( ); ) {
                Object newObject = this.transform(it.next( ));
                target.add(newObject);
            }
            return target;
        }
    }
}
```

In this way a developer does not need to call a loop method each time when transforming collections, and this produces naturally a left-to-right, top-down parsing method, which makes applying heuristics for rule selection more natural. This method can be extended as well with multiple parameters.

Figure 3:
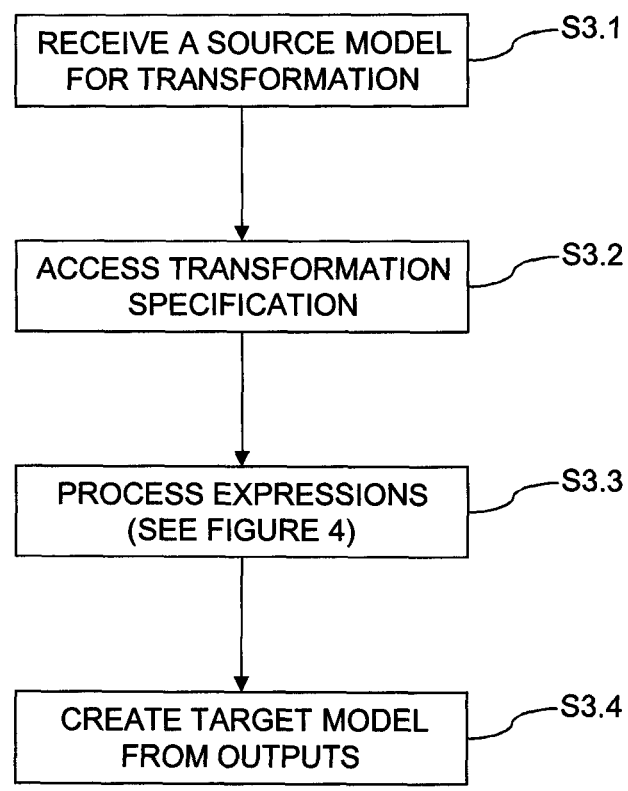
FIG. 3 is a flow diagram of a method of transforming a source model to a target model in accordance with an embodiment.
Figure 4:
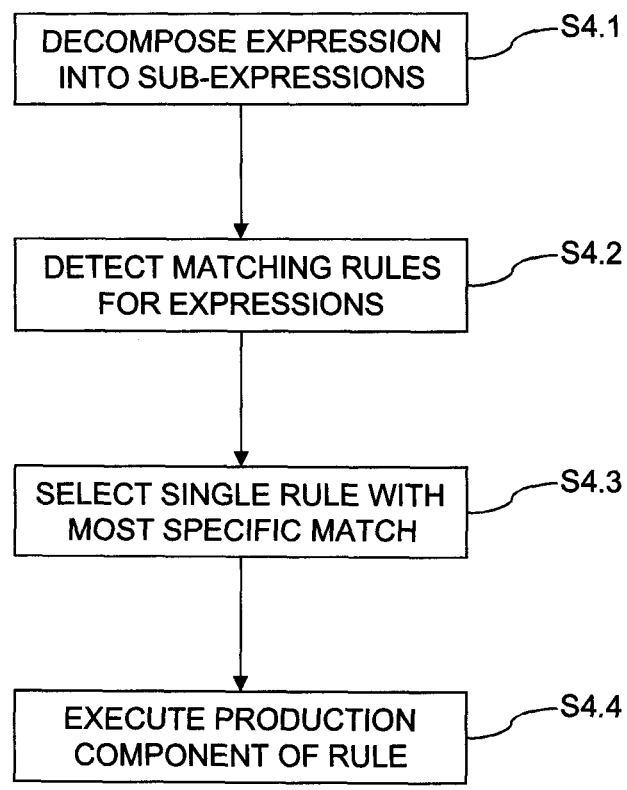
FIG. 4 is a flow diagram showing more detail of the flow diagram of FIG. 3 in accordance with an embodiment.

The methodology of the transformation process is summarized in the flowcharts of FIGS. 3 and 4. The method of transforming a source model 10 into a target model 12 begins at step S3.1 in which a source model 10 is received followed by accessing a transformation specification 14 which comprises a set of rules 16 at step S3.2. Each rule 16 comprises a pattern description 18 and a production component 20. The pattern description 18 comprises a pattern in the source model 10, and the production component 20 comprises an algorithm for generating an output in the target model 12 from the pattern. In step S3.3, the expressions in the source model 10 are processed and at step S3.4 a target model 12 is created from the output of step S3.3.

FIG. 4 shows the step S3.3 in more detail. For each expression in the source model 10, at step S4.1, the expression is decomposed into sub-expressions, and at step S4.2, matching rules 16 in the transformation specification 14 for the expression and the sub-expressions are detected. In step S4.3 a single rule 16 with the most specific pattern description 18 of the detected matching rules 16 is selected, and in step S4.3, the production component 20 of the selected rule 16 is executed to generate an output in the target model 12.

With regard to the step of selecting a single rule with the most specific pattern description of the detected matching rules, if more than one rule is returned with the same most specific pattern description, the first such rule in the transformation specification may be selected. In selecting which of multiple rules to use, if more than one rule that matches an expression are equally specific, then the first available matching rule may be selected in the order that the transformation specification has been written.

Selecting a single rule with the most specific pattern description of the detected matching rules may include favouring rules with pattern descriptions matching a specific type in the expression over rules with pattern descriptions matching a more general version of the specific type in the expression. Selecting a single rule with the most specific pattern description of the detected matching rules may include choosing the rule that matches on a specific type within the expression of the source model over any rules that match on a more general version of the specific type. For example, if a search finds a first rule whose pattern matches a person and a second rule whose pattern matches an employee (which is a specific kind of person), then the second rule is chosen over the first one, as this rule is more specific.

Selecting a single rule with the most specific pattern description of the detected matching rules may include favouring rules with narrower conditions over rules with wider conditions. In selecting a single rule with the most specific pattern description of the detected matching rules, another method of making this determination may include if the primary method does not return a rule, a rule that filters a narrower domain over any similar rules that filter a wider domain is chosen. For example, a first rule that has a pattern that matches if a person's age is <30 will be favoured over second (similar) rule with a pattern that matches if a person's age is <45. The first rule has a narrower condition when compared to the second rule.

Selecting a single rule with the most specific pattern description of the detected matching rules may include favouring rules with more conditions matching the expression over rules with fewer conditions matching the expression. In selecting a single rule with the most specific pattern description of the detected matching rules a further method of making this determination, if the primary or secondary methods do not return a rule, is to choose the rule that matches a greater number of conditions within the expression of the source model that is being examined over a rule that matches fewer conditions.

What is claimed is:

1. A method of transforming a source model to a target model, comprising:
   receiving the source model;
   accessing a transformation specification comprising a set of rules, each rule of the set of rules comprising a pattern description and a production component, the pattern description comprising a pattern in the source model and the production component comprising an algorithm for generating an output in the target model from the pattern;
   for each expression in the source model:
   decomposing the expression into sub-expressions;
   detecting matching rules in the transformation specification for the expression and the sub-expressions;
   selecting one of the matching rules having a most specific pattern description; and
   executing the production component of a selected rule to generate the output in the target model; and
   creating the target model from generated output.

2. A method according to claim 1, wherein the selecting one of the matching rules having the most specific pattern description comprises:
   upon determining more than one rule is returned with the same most specific pattern description, selecting a first rule of the matching rules in the transformation specification.

3. A method according to claim 1, wherein the selecting one of the matching rules having the most specific pattern description comprises:
   favouring rules with pattern descriptions matching a specific type in the expression over rules with pattern descriptions matching a more general version of the specific type in the expression.

4. A method according to claim 1, wherein the selecting one of the matching rules having the most specific pattern description comprises:
   favouring rules with narrower conditions over rules with wider conditions.

5. A method according to 1, wherein the selecting one of the matching rules having the most specific pattern description comprises:
   favouring rules with more conditions matching the expression over rules with fewer conditions matching the expression.

6. A system for transforming a source model to a target model, comprising:
   a computer processor configured to perform:
   receiving the source model;
   accessing a transformation specification comprising a set of rules, each rule of the set of rules comprising a pattern description and a production component, the pattern description comprising a pattern in the source model and the production component comprising an algorithm for generating an output in the target model from the pattern;
   for each expression in the source model:
   decomposing the expression into sub-expressions;
   detecting matching rules in the transformation specification for the expression and the sub-expressions;
   selecting one of the matching rules having a most specific pattern description; and
   executing the production component of a selected rule to generate the output in the target model; and
   creating the target model from generated output.

7. A system according to claim 6, wherein the selecting one of the matching rules having the most specific pattern description comprises:
   upon determining more than one rule is returned with the same most specific pattern description, selecting a first rule of the matching rules in the transformation specification.

8. A system according to claim 6, wherein the selecting one of the matching rules having the most specific pattern description comprises:
   favouring rules with pattern descriptions matching a specific type in the expression over rules with pattern descriptions matching a more general version of the specific type in the expression.

9. A system according to claim 6, wherein the selecting one of the matching rules having the most specific pattern description comprises:
   favouring rules with narrower conditions over rules with wider conditions.

10. A system according to claim 6, wherein the selecting one of the matching rules having the most specific pattern description comprises:
    favouring rules with more conditions matching the expression over rules with fewer conditions matching the expression.

11. A computer program product for transforming a source model to a target model, the computer program product comprising a computer readable storage medium having program code embodied therewith, the program code executable by a computer perform a method comprising:
    receiving the source model;
    accessing a transformation specification comprising a set of rules, each rule of the set of rules comprising a pattern description and a production component, the pattern description comprising a pattern in the source model and the production component comprising an algorithm for generating an output in the target model from the pattern;

for each expression in the source model:

decomposing the expression into sub-expressions;

detecting matching rules in the transformation specification for the expression and the sub-expressions;

selecting one of the matching rules having a most specific pattern description; and executing the production component of a selected rule to generate the output in the target model; and creating the target model from generated output.

12. A computer program product according to claim 11, wherein the selecting one of the matching rules having the most specific pattern description comprises:

upon determining more than one rule is returned with the same most specific pattern description, selecting a first rule of the matching rules in the transformation specification.

13. A computer program product according to claim 11, wherein the selecting one of the matching rules having the most specific pattern description comprises:

favouring rules with pattern descriptions matching a specific type in the expression over rules with pattern descriptions matching a more general version of the specific type in the expression.

14. A computer program product according to claim 11, wherein the selecting one of the matching rules having the most specific pattern description comprises:

favouring rules with narrower conditions over rules with wider conditions.

15. A computer program product according to claim 11, wherein the selecting one of the matching rules having the most specific pattern description comprises:

favouring rules with more conditions matching the expression over rules with fewer conditions matching the expression.

* * * * *